Patented Dec. 25, 1945

2,391,855

UNITED STATES PATENT OFFICE 2,391,855

PLASTER BODY AND METHOD OF MAKING

Xarifa Bean, Yellow Springs, Ohio

No Drawing. Application August 9, 1941,
Serial No. 406,173

7 Claims. (Cl. 22—192)

This invention relates to the art of making permeable plaster bodies and of developing highly permeable structure therein, and to such plaster bodies per se. More particularly the invention relates to control of dimensional changes and of impairment of surface, which has heretofore occurred in such plaster bodies and especially for control of the form and surface of highly permeable molds used in casting of metals and the like, and to the production of molds and other plaster impressions having improved quality, physical characteristics, and high accuracy of reproduction of surface form and texture.

In a prior Patent No. 2,220,703 there has been described and claimed a method for increasing the permeability and otherwise improving the quality of plaster of Paris molds for casting of metals and the like, after the plaster has been molded and set to a solid body. One of the phenomena which has been commonly experienced with this process is an expansion of the material. This in some instances is an advantage. In other cases, however, and particularly in casting-molds having intricate shapes, it may result in changes in the dimensions of the mold cavity which due to differences in the expanding masses may not be strictly proportional and, therefore, may cause small changes in form as well as dimensions. This expansion is in addition to that which occurs in all plaster of Paris bodies during the several hours following the initial setting of plaster; in amount this additional expansion may be ten times or more as great as that occurring in the ordinary set plaster without development of the permeable oölitic structure.

The expansion of ordinary plaster bodies after the initial set, has been studied by a number of investigators. This expansion has been assumed to result from a gradual conversion of the calcium sulfate from an initial orthorhombic crystal form, which is unstable, into a stable monoclinic crystal form, this change being accompanied by expansion; and it has been suggested that the presence of soluble salts (which also act as accelerators or retarders of the setting of the plaster) effectively reduce this expansion by promoting immediate formation of the stable monoclinic crystals and avoiding preliminary formation of the unstable orthorhombic form (Sodeau and Gibson, British Dental Journal, vol. 48 (1927), 1089 et seq., 1091).

In the treatment of a set plaster body for the development of a permeable oölitic structure as heretofore commercially practiced, the greatest expansion occurs during the treatment in the autoclave in the presence of steam pressure. This is followed by a further but lesser expansion during the rehydration of the calcium sulfate (which has been dehydrated to the semi-hydrate condition during the autoclaving treatment) and this in turn is followed by a shrinkage during drying of excess water from the plaster body, which shrinkage has been less in amount than the expansion occurring on the initial setting and, therefore, has been relatively unimportant in the total dimensional changes.

In this treatment for development the permeable oölitic structure, as set forth for example in the Patent No. 2,220,703, it has been customary to subject the set plaster to an initial or preliminary drying before its dehydration and rehydration, by which the oölitic structure is developed. Experience has shown that variations in the extent of this preliminary drying may result in substantial alterations in the total dimensional changes of the mold after its initial setting on the pattern and may also cause objectionable variations in permeability, so that, for the most accurate casting work, it has become the practice to control this preliminary drying within close limits.

It is one object of the present invention to reduce the dimensional changes occurring in plaster molds after setting of the plaster on a pattern, and particularly to avoid changes in form or proportions resulting from differential expansion in different parts of the mold.

Another object of the invention is to reduce variations in dimensional changes from day to day notwithstanding atmospheric changes and other normal variations of plant conditions, operative treatment and materials used.

Another object of the invention is to make possible a greater latitude in the treatment of molds before processing to develop a desired permeable structure therein and particularly to avoid the need for carefully controlled preliminary drying.

Another object is to facilitate control of surface texture to avoid loss of fidelity of surface reproduction when a desired permeable structure is developed.

Another object of the invention is to avoid distortion of mold cavity form when molds made in rigid flasks or frames are treated for development of a desired permeable structure.

Another object is to reduce the time required for development of a desired permeable structure.

With these objects in view, as well as others which will be apparent to those skilled in the art, I have found that the addition of a small proportion of one or more soluble salts or bases will exert a control, not only on the expansion following the initial setting of the plaster, but likewise upon the expansion which would otherwise occur during the development of the permeable structure. With any given compound this controlling effect in general increases, but at a decreasing rate, with increases in the amount of compounds added, up to a few percent by weight of the calcium sulfate. In general it has been found that with highly ionized compounds desirable effects may be obtained according to my invention using from 0.001 to .15 gram equivalents of the compound per gram equivalent of calcium sulfate in the plaster composition. In practice about 2-70 grams per liter added to the water used in mixing the plaster will be suitable. The particular amount chosen will, of course, depend upon the particular compound being used and the other ingredients of the plaster composition: a lesser amount of the compound, of course, being required for the more active compounds and for the plaster compounds which have relatively low expansion without such compound. In the case of the best potassium compounds, for example, an amount of the compound between .010 and .020 gram equivalents per gram equivalent of calcium sulfate used in the plaster will give optimum results. taking into consideration economy of the compound; although substantially greater amounts can be used with most of these compounds without substantially impairing the desired effect, and such effect may even be improved a little by further increase above the optimum amount. although such improvement is less than proportional to that shown by smaller additions. As much as 0.15 gram equivalents of the compound per gram equivalent of calcium sulfate hemihydrate can be used, whereas double that amount is generally too much.

I have found that potassium compounds are most effective for this purpose and in general most satisfactory. and that in general the compounds of the alkalies (including ammonium), are better than those of the heavier metals. To distinguish these soluble compounds, including both salts and bases, from substantially insoluble compounds and organo-metal compounds in which the metal is not ionized to any great extent, I have referred to the former generally as "highly ionized compounds," it being understood, of course, that this refers to their condition in water solutions.

Not all of these compounds, however, are equally desirable for the purposes of my invention, and they will be found to have various effects upon other properties of the plaster. Thus, the hydroxides or bases generally tend to inhibit the formation of the oölitic structure; and where these are used it will be advisable to use a counteracting acidic agent, as for example in the case of potassium hydroxide and phosphoric acid, specifically described below. In general the compounds which are most suitable for dimensional control will also act as accelerators or retarders of setting; and the amount of such compounds which may be desirable for dimensional control may be such as will produce objectionable changes in the time of setting of the plaster composition. Where this is the case, this can be offset by using in the same composition both accelerator and retarder. In general, I have found that those compounds which act as retarders when used in substantial amount tend to weaken the set plaster to such an extent that the plaster mold or other body may be difficult to handle without injury and may even be disintegrated by pressure changes in the autoclave during treatment for development of the permeable structure. Thus, although a retarder may be used with an accelerator to counteract the effect on setting time, and, to the extent used, may serve also for controlling the dimensional changes, I have found it advantageous to rely primarily upon an accelerator for control of dimensional changes.

Although the reasons which have been given for the expansion immediately following initial set do not exist in the autoclaving treatment or in the rehydration of the autoclaved plaster bodies, there is a surprising correlation between substances which control the former expansion and those which control expansion during development of the permeable structure. In general compounds which show the one effect will also show the other, although compounds which are most suited for the one purpose are not necessarily best suited for the other purpose.

It will be found that some of the compounds which are very satisfactory from other points of view tend, upon the drying of the plaster body, to come to the surface and to crystallize above the surface to give a "blooming" or "efflorescence" which in some cases is easily brushed off. whereas in other cases it may produce a permanent impairment of the surface for use as a casting mold. Where this difficulty is experienced, I have found that it may be counteracted in any of several ways. In the first place, where a casting mold is concerned, the mold cavity may be closed during the drying so that the water is removed entirely by evaporation on the surfaces at the back of the mold body and away from the surfaces in the mold cavity. In this way the efflorescence is limited to those surfaces where it is unobjectionable. Secondly, I have found that this objection may be eliminated by drying in a stream of air at high temperature, for example, 140° to 200° C., which quickly dries the actual surface to such an extent that the evaporation of water and any consequent crystallization of dissolved compounds will occur actually below the surface of the plaster. As a third alternative, I have found that the surface of the plaster may be treated with compounds which tend to precipitate the dissolved compound below the surface and thereby to avoid the crystallization at the surface where evaporation occurs. A fourth alternative, of course, is to use for control of dimensional changes a compound which does not produce blooming or efflorescence. In all of these the soluble compound is deposited at a distance from the surface of the plaster body when the excess water is evaporated.

It is an advantage of the use of potassium compounds that under suitable conditions the potassium ion reacts with the calcium sulfate in the plaster to form syngenite, $CaK_2(SO_4)_2 \cdot H_2O$.

Of the various compounds tested, I have found potassium thiocyanate to be most satisfactory in this respect. Used in amounts between one-half and one percent by weight of the calcium sulfate this compound gives good dimensional control without any substantial impairment of the mold surface.

In addition to the control of dimensional changes already described, the addition of such compounds to the plaster composition in accordance with my invention results in a stabilization. The desired permeability can be developed with no preliminary drying or with wide variations in preliminary drying without commensurate variations in permeability whereas without such additions the permeability has varied considerably with even relatively small variations in the extent of pre-drying. This and other properties remain within much closer limits in spite of other inevitable changes in plant conditions, operating procedures and material analysis. Additions of such compounds also improve such properties as mold strength, surface hardness and permeability.

I have also discovered that the fine-textured surface formed on the initial molding of the plaster over the pattern may be rendered harder and more stable by spraying or otherwise treating the surface with a conditioning agent which forms substantially insoluble substances in the surface. Substances which are very beneficial when thus used in accordance with my present invention could not be satisfactorily used without the dimension control of my present invention, since they would cause surface cracking or "checking" upon the expansion of the body of the mold during the development of the permeable structure. By controlling that expansion, however, and also treating the surface with such surface conditioning agent I am able to preserve and even improve the surface and to avoid the necessity of carefully controlled preliminary drying of free water from the surface, which has been practiced heretofore in order to avoid development of a coarse-grained structure at the surface. Thus, for example, I have found that a coating of sodium silicate at the same time improves the physical characteristics of the surface and renders it sufficiently insoluble so that, even with excess water and conditions such as would have streaked the mold surface and allowed the oölitic structure to come through into the surface in the absence of such surface treatment, first-class fine-surfaced molds may now be produced.

Where free sulfur or a compound yielding sulfur has been used in the plaster composition of which the mold is made, I have found that spraying the surface with a solution of a cadmium compound improves the surface characteristics by formation of insoluble cadmium sulfide in the surface.

This latter treatment has the further important advantage of giving a very distinctive surface coloration of bright yellow which, being contained only in the thin fine-textured surface layer, will give an immediate indication if that layer has in any way been broken away or seriously injured. This greatly facilitates the final inspection of the molds before casting and encourages careful handling throughout and thus may save important losses which otherwise would occur due to defects in the mold surface. It will be understood, of course, that this surface coloration may be obtained in other ways, for example, in the case where a water glass is used alone for the surface treatment a dye such as phenolphthalene may be added to the material. This has the further advantage that it gives the operator when spraying the solution onto the surface a good visual basis for obtaining an even coverage. The color, if it is to be used for facilitating inspection should be one which can withstand the steam pressure of the autoclave treatment without decoloration.

I am giving below several specific examples of my invention. It should be understood that these are not intended to be exhaustive nor limiting of my invention but on the contrary are chosen and here set forth with a view to instructing others in the principles of my invention and the application of the same to practical use, in order that others skilled in the art may be enabled to adapt and modify the invention and to apply it in each case as may be best suited to the conditions of the particular use.

*Example 1.*—A plaster of Paris composition consisting of:

| | Per cent |
|---|---|
| Plaster of Paris (calcined gypsum powder) | 61 |
| Finely divided talc | 17 |
| Silica flour | 21 |
| Fibrous asbestos | 1 | may be mixed with an additional 1% of sulfur flour and the resulting dry mixture then mixed with about eighty-five per cent of its weight of water having dissolved therein .55% of potassium hydroxide and .05% metaphosphoric acid. These ingredients are mixed as in the case of ordinary molding plasters and are then poured over a suitable pattern and allowed to set.

It is an advantage of my invention that the solid body of set plaster may be transferred immediately after setting to the autoclave for development of the permeable structure. It will ordinarily be found preferable, however, to allow the mold to stand over night or for a day before processing. By reason of the potassium hydroxide-phosphoric acid-sulfur addition to this plaster no special preliminary drying is required during this time, nor is it essential to protect the plaster against drying if it is in an ordinary atmosphere not exposed to drafts of dry air.

In the processing for the development of the permeable structure, the molds may be placed in an autoclave and steam introduced to bring up the pressure and temperature to a value between 10 and 30 lbs. per square inch, saturated steam, e. g., about 15 to 17 lbs. This introduction of steam and consequent heating to bring the autoclave up to pressure may consume about one hour. Pressure is then maintained for nine hours, after which it is allowed to blow off and the damp molds are placed in a still atmosphere of relatively high humidity where they cool gradually and are allowed to set for about 15 hours, during which time the calcium sulfate hemi-hydrate formed by the autoclaving step is rehydrated by excess water within the mold reconverting the calcium sulfate to a dihydrate condition. After this period the molds are moved into a drier in which they are exposed to a stream of dry air at about 140°–170° C. with an air velocity of about 100 feet per minute. The resulting mold is characterized by a high permeability, a fine-grained oölitic structure throughout the body of the mold, and a smooth very fine-grained typical plaster at the surface of the mold. The total expansion from the pattern dimensions to the dimensions of the completed mold ready for casting on a 10 inch test bar used for micrometer measurements has been found to be about 0.023", i. e., at the rate of 0.0023" expansion per inch.

I find that for practical operation a pattern shrinkage of .011 to .012 inch per inch gives very good result in the casting of aluminum and the mold expansion on processing will not in general exceed .0015 inch per inch.

The potassium hydroxide and the metaphosphoric acid in this composition are substantially balanced, the one against the other, so that the initial setting time of the plastic composition is substantially the same as without such additions, although the potassium hydroxide acts as a powerful accelerator when used alone and the metaphosphoric acid acts as a retarder.

As a further modification of the above, the surfaces of the mold which have been formed in contact with the pattern may be treated after the mold is removed from the pattern and before the processing for development of the permeable structure, by spraying with sodium silicate and cadmium chloride. I may use, for example, a sodium silicate such as is sold by the Philadelphia Quartz Company under the designation "S" Brand sodium silicate diluted with about 12½ times its own volume of water and with an addition of about 2 cc. of a 5% neutral alcoholic solution of phenolphthalein per gallon of the sodium silicate solution, which gives to the solution a pink tint easily observable on the white plaster when the solution is applied. This solution is then sprayed with an air brush onto the mold surface just enough to impregnate the surface and give it a pink tint throughout.

Following the sodium silicate treatment described above, the same surfaces may be then sprayed with a 3% solution of cadmium chloride. This step is not essential, but improves the surface quality of the mold and furthermore, as stated above, gives to the mold a bright permanent golden coloring which facilita s final inspection and encourages careful handling throughout the plant.

*Example 2.*—The same procedures as described above can be used with other commercial molding plasters. For example, with a composition consisting of:

| | Per cent |
|---|---|
| Plaster of Paris | 35 |
| Banding sand | 60 |
| Finely divided talc | 3.5 |
| Silica flour | 0.5 |
| Fibrous asbestos | 1 | the same procedure may be followed as in Example 1. Due to the high percentage of sand, however, the molded plaster will show a slightly higher expansion than in Example 1.

*Example 3.*—Using either of the above basic plaster compositions, I may use, instead of the potassium hydroxide and metaphosphoric acid, potassium thiocyanate, for example in amount from about 0.5 to 1.0% of the water used in mixing, and potassium citrate, in amount sufficient to counteract the accelerating effect of the potassium thiocyanate and give the desired setting time, e. g., from about 0.015 to 0.04% of mixing water. Thus, with the basic plaster composition given in Example I, I have found that 0.75% of potassium thiocyanate and 0.15 potassium citrate is about optimum.

The same procedures as set forth above may be used with or without the spraying of the mold surfaces with a hardening or protective agent.

*Example 4.*—To either of the commercial molding plasters described in the Examples 1 and 2, I may add to the mixing water used 0.5–1% of potassium sulfate and .015 to .04% or less of potassium citrate as required to give the desired setting time.

The results with this composition are on the whole similar to but not quite as good as those of Examples 1 and 2. A soft efflorescence may appear on the mold surface if the special precautions for protection of the surface, as described, are not taken, but this efflorescence may be readily brushed off.

Instead of potassium citrate, sodium citrate may be used; or other retarders may be used to counteract the tendency of the potassium sulfate to act as an accelerator of setting.

Other compounds may be used in these examples instead of those mentioned, or in mixture with them. Thus, I have used potassium chloride, potassium nitrate, barium chloride, ammonium hydroxide, barium hydroxide, potassium carbonate, potassium oxalate, ammonium sulfate, potassium bromide, potassium thiosulfate, ammonium thiocyanate, calcium hydroxide, magnesium hydroxide, etc.

One of the important advantages of my invention is the stability of the expansion characteristic, that is to say, the uniformity from day to day with the minor variations in conditions, in handling and in raw materials, which occur under plant conditions. Thus, with a plaster composition of Example 4 control tests made side by side with the same materials and procedures, but respectively with and without the addition of the expansion controlling material, showed over a period of six days an average reduction in total expansion from 0.0081 inch per inch to 0.0023 inch per inch by use of the potassium sulfate-potassium citrate addition; and, what is more important from the point of view of accuracy of reproduction of patterns by casting, whereas, without the potassium compounds according to the present invention, the total expansion varied from day to day from a maximum of 0.013 inch per inch to a minimum of 0.006 inch per inch, with the controlling agent of the present invention the maximum variation was from 0.0021 to 0.0025.

Another advantage of my invention which may be illustrated by the Example 4 is the reduction in the time required between the end of the autoclaving process and the full development of the desired permeable structure and also the degree of permeability which is developed as a result of this process.

Again in comparing a control test of the plaster without addition and the same plaster with the same handling differing only in the addition of the control materials according to Example 4, the development of the permeable structure was substantially complete at the end of 4½ hours and the permeability had already risen to a value nearly 30% higher than the maximum attained in the control tests, whereas, at the end of 4½ hours the plaster without addition had barely begun to develop the permeable structure, its permeability still remained very low. Not until the end of six hours had the plaster in the control test developed substantially its full permeability; and, as already stated, even then it was more than 30% below the corresponding value for the material of Example 4.

With the plaster of Example 2 used as described in Example 4, the final permeabilities reached are not substantially different; but the difference in the time required to reach the full permeability is even more striking. In this case a permeability of about half the final maximum is reached in 3½ hours with the material and treatment of Example 4 and not until 8½ hours with the same plaster and treatment except for omission of the potassium sulfate and citrate.

The permeability is substantially completely developed by the end of 7 hours in the former case and not until 12 hours in the latter case.

Molds made according to any of these examples may be cast in iron or other rigid flasks or frames and may include relatively large metal chills and reinforcements without substantial distortion of or injury to the molds as a result of differential expansion.

I have used the term "oölitic" herein to describe a structure such as that formed by a treatment as set forth in the Patent No. 2,220,703, wherein the calcium sulfate is in the form of small more or less distinct grains which can be picked apart from the mass in which they occur without destroying the identity of the grains. Depending upon the composition and the conditions of formation, the larger grains may be as large as 1/16 inch or more, or so small as to be barely distinguishable to the naked eye, or of any desired intermediate size. Other grains in the mass will range in size down to microscopic dimensions.

What I claim is:

1. The method of making molds for reproduction of patterns by casting, which comprises making a fluid mix of a gypsum plaster composition, water, potassium hydroxide in amount equal to about one-fourth to two percent by weight of the calcium sulfate, meta phosphoric acid in amount about one-tenth that of the potassium hydroxide, finely divided sulfur in amount equal to about two percent by weight of the calcium sulfate, setting said plaster mix on a pattern, removing the set plaster body from the pattern, air-drying the mold surface of said body, impregnating said surface with a weak solution of alkali silicate, impregnating said surface with a solution of a few percent cadmium chloride, heating the thus treated plaster body in an atmosphere of steam at pressure between 10 and 30 lbs. per square inch, removing the plaster body from the steam and allowing it to cool to room temperature and to remain moist until the desired oölitic structure has developed, and then drying the mold body in a current of drying gas at a temperature about 140°–200° C.

2. The method of making a mold for accurately reproducing a pattern by casting, which comprises forming and setting on the pattern a plaster composition having therein soluble accelerator and retarder to control dimensional changes during subsequent treatment, treating the molding surface of the resulting plaster body which has been formed by the pattern with an alkaline silicate solution to inhibit development of a coarse grained structure at said surface, and thereafter treating said body to dehydrate and rehydrate the calcium sulfate in said body whereby to develop an oölitic structure within said body.

3. The method of making a mold for accurately reproducing a pattern by casting, which comprises forming and setting on the pattern a plaster composition having therein soluble accelerator and retarder to control dimensional changes during subsequent treatment, treating the molding surface of the resulting plaster body which has been formed by the pattern with a thin solution of sodium silicate to inhibit development of a coarse grained structure at said surface, and thereafter treating said body to dehydrate and rehydrate the calcium sulfate in said body whereby to develop an oölitic structure within said body.

4. The method of making a mold for accurately reproducing a pattern by casting, which comprises forming and setting on the pattern a plaster composition having therein soluble accelerator and retarder to control dimensional changes during subsequent treatment, treating the molding surface of the resulting plaster body which has been formed by the pattern to inhibit development of a coarse grained structure at said surface, treating said surface with a coloring agent adapted to produce a color limited to said surface and not destroyed by the treatment required for developing the oölitic structure, and thereafter treating said body to dehydrate and rehydrate the calcium sulfate in said body whereby to develop an oölitic structure within said body.

5. The method of making a mold for accurately reproducing a pattern by casting, which comprises forming and setting on the pattern a plaster composition having therein soluble accelerator and retarder and available sulfur, treating the molding surface of the resulting plaster body which has been formed by the pattern with a thin solution of sodium silicate and a dye, treating said surface with cadmium chloride, and thereafter treating said body to dehydrate and rehydrate the calcium sulfate in said body whereby to develop an oölitic structure within said body.

6. The method of making a mold for accurately reproducing a pattern by casting, which comprises forming and setting on the pattern a plaster composition removing the pattern therefrom and promptly thereafter treating said surface with a coloring agent adapted to remain substantially entirely at said surface and to survive all treatments of the mold up to casting, whereby to give clear warning of any destruction or injury of said surface.

7. The method of making a mold for accurately reproducing a pattern by casting which comprises adding to a calcium sulfate plaster composition a soluble accelerator of setting, forming and setting the plaster composition on a pattern, and evaporating water from said body through a surface thereof other than that formed on said pattern while substantially protecting said latter surface against evaporation therefrom.

XARIFA BEAN.